(12) United States Patent
Takemoto et al.

(10) Patent No.: US 12,522,077 B2
(45) Date of Patent: Jan. 13, 2026

(54) VEHICLE POWER SUPPLY SYSTEM

(71) Applicant: TOYOTA JIDOSHA KABUSHIKI KAISHA, Toyota (JP)

(72) Inventors: Satoru Takemoto, Okazaki (JP); Akihiro Ozeki, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/791,766

(22) Filed: Aug. 1, 2024

(65) Prior Publication Data

US 2025/0100388 A1 Mar. 27, 2025

(30) Foreign Application Priority Data

Sep. 21, 2023 (JP) .................................. 2023-155678

(51) Int. Cl.
*B60L 3/04* (2006.01)
*B60L 58/18* (2019.01)

(52) U.S. Cl.
CPC ................. *B60L 3/04* (2013.01); *B60L 58/18* (2019.02)

(58) Field of Classification Search
CPC ................................... B60L 3/04; B60L 58/18
USPC .................................................. 307/9.1, 10.1
See application file for complete search history.

(56) References Cited

U.S. PATENT DOCUMENTS

2022/0169193 A1* 6/2022 Mazaki ................... H02J 7/143

FOREIGN PATENT DOCUMENTS

JP          2023-032346 A      3/2023

* cited by examiner

*Primary Examiner* — Rexford N Barnie
*Assistant Examiner* — Xuan Ly
(74) *Attorney, Agent, or Firm* — SoraIP, Inc.

(57) ABSTRACT

A vehicle power supply system includes: a first power supply; a second power supply; a first switch inserted between the first power supply and a first load belonging to a load group of a first system; a second switch inserted between the second power supply and a second load belonging to a load group of a second system; a third switch inserted between the first power supply and the second power supply; a first switch; a second switch; and a control unit for controlling a state of conduction/disconnection of the third switch, wherein, when an abnormality occurs in power supply, the control unit controls the first switch, the second switch, and the third switch, and identifies a location where the abnormality occurs based on a current flowing through the first switch and a current flowing through the second switch.

3 Claims, 7 Drawing Sheets

VEHICLE POWER SUPPLY SYSTEM

CROSS-REFERENCE TO RELATED APPLICATION

This application claims priority to Japanese Patent Application No. 2023-155678 filed on Sep. 21, 2023, incorporated herein by reference in its entirety.

BACKGROUND

1. Technical Field

The present disclosure relates to a vehicle power supply system that controls supply of power by a plurality of power supplies installed in a vehicle.

2. Description of Related Art

Japanese Unexamined Patent Application Publication No. 2023-032346 (JP 2023-032346 A) discloses a vehicle power supply system of a configuration in which a main power supply system to which an auxiliary power supply is connected, and a backup power supply system to which a high-voltage power supply is connected, are electrically connected via switches. Description is made therein that, in this vehicle power supply system, when an abnormality occurs in one system, the switch is shut off to disconnect one system in which the abnormality is occurring, and operation of a vehicle is continued by another system in which no abnormality is occurring.

SUMMARY

However, in the vehicle power supply system described in JP 2023-032346 A, while which of the main power supply system and the backup power supply system that an abnormality has occurred in can be determined, which part of the system in which the abnormality has occurred cannot be identified.

The present disclosure has been made in view of the above problem, and an object thereof is to provide a vehicle power supply system that is capable of identifying a site at which an abnormality has occurred, when the abnormality occurs in supply of power.

In order to solve the above problem, one aspect of the technology according to the present disclosure is a vehicle power supply system installed in a vehicle, the vehicle power supply system including a first power supply connected to a load group of a first system so as to supply power, a second power supply connected to a load group of a second system so as to supply power, a first switch interposed between the first power supply and a first load belonging to the load group of the first system, a second switch interposed between the second power supply and a second load belonging to the load group of the second system, a third switch interposed between the first power supply and the second power supply, and a control unit for controlling a state of conducting and nonconducting of the first switch, the second switch, and the third switch, in which, when an abnormality occurs in supply of power, the control unit controls the first switch, the second switch, and the third switch, to identify a site of an abnormality occurring, based on a current flowing through the first switch and a current flowing through the second switch.

According to the vehicle power supply system of the present disclosure, when an abnormality occurs in the supply of power, switching of the conducting state and the nonconducting state of the switches is controlled as appropriate, and changes in current flowing through the first switch and the second switch are each observed. Based on changes in the current, a specific site where an abnormality of overcurrent flowing due to a ground fault or the like is occurring, can be further narrowed down from the broad range of a system and identified.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle power supply system according to the present disclosure uses a switch inserted in a preceding stage of a load, and determines whether or not an abnormality has occurred under the control of the switch based on a change in a current flowing during conduction/interruption of the switch when an abnormality occurs in power supply in the system.

Hereinafter, an embodiment of the present disclosure will be described in detail with reference to the drawings.

First Embodiment

Configuration

Figure 1:
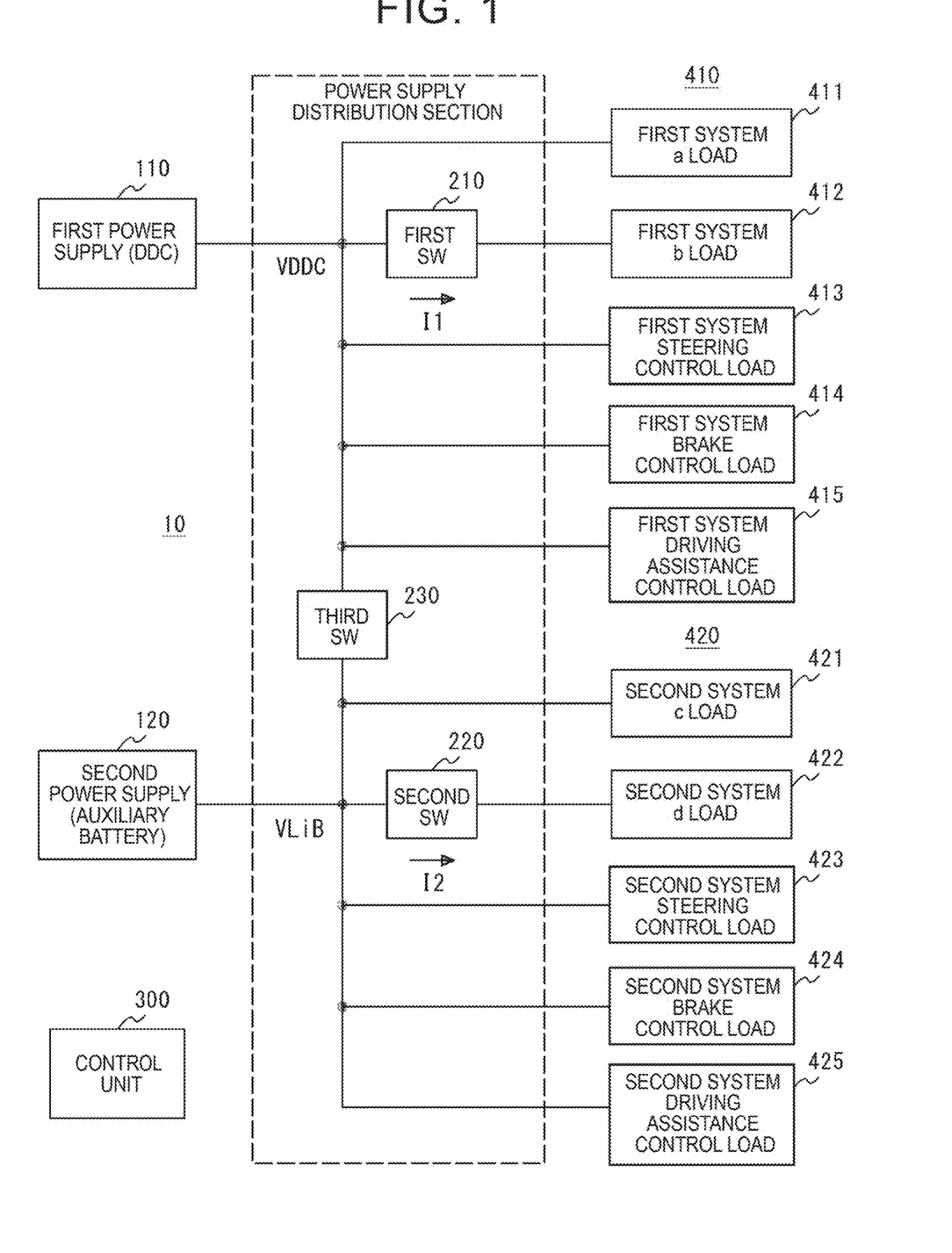
FIG. 1 is a functional block diagram of a vehicle power supply system and a peripheral portion thereof according to a first embodiment of the present disclosure.

FIG. 1 is a functional block diagram of a vehicle power supply system 10 and a peripheral portion thereof according to a first embodiment of the present disclosure. The functional block illustrated in FIG. 1 includes a vehicle power supply system 10, a load group 410 of a first system, and a load group 420 of a second system. The vehicle power supply system 10 includes a first power supply 110, a second power supply 120, a first SW 210, a second SW 220, a third SW 230, and a control unit 300. The load group 410 of the first system includes a first system a load 411, a first system b load 412, a first system steering control load 413, a first system brake control load 414, and a first system driving assistance control load 415. The load group 420 of the second system includes a second system c load 421, a second system d load 422, a second system steering control load 423, a second system brake control load 424, and a second system driving assistance control load 425. The vehicle power supply system 10, the load group 410 of the first system, and the load group 420 of the second system may be mounted on the vehicle.

The first power supply 110 is a power supply source for supplying power to the load group 410 of the first system and the load group 420 of the second system. The first power supply 110 is connected to the load group 410 side of the first system. Examples of the first power supply 110 include a secondary battery (high-voltage battery) configured to be chargeable and dischargeable, such as a lithium-ion battery, and a DCDC converter (DDC) that converts electric power of a secondary battery (not shown) into a predetermined voltage.

The second power supply 120 is a power supply source for supplying power to the load group 410 of the first system and the load group 420 of the second system. The second power supply 120 is connected to the load group 420 side of the second system. As the second power supply 120, a secondary battery (auxiliary battery) configured to be chargeable and dischargeable, such as a lithium ion battery or a lead storage battery, or the like, can be exemplified.

The first SW 210 is a switching device (e.g., a semiconductor switch) capable of switching between an electrically conductive state and a disconnected state under the control of the control unit 300. This first SW 210 is inserted between the first power supply 110 and the first system b load 412 (first load) belonging to the load group 410 of the first system.

The second SW 220 is a switching device (e.g., a semiconductor switch) capable of switching between an electrically conductive state and a disconnected state under the control of the control unit 300. This second SW 220 is inserted between the second power supply 120 and the second system d load 422 (second load) belonging to the load group 420 of the second system.

The third SW 230 is a switching device (e.g., a semiconductor switch) capable of switching between an electrically conductive state and a disconnected state under the control of the control unit 300. This third SW 230 is inserted between the first power supply 110 and the second power supply 120. That is, the third SW 230 connects the load group 410 of the first system and the load group 420 of the second system so that power can be mutually transmitted and received.

The control unit 300 is configured to monitor a state of power supplied to the vehicle power supply system 10 and to control (switch) a state of conduction/disconnection of the first SW 210, the second SW 220, and the third SW 230. The control unit 300 can detect the occurrence of an anomaly in supplying power to the vehicle power supply system 10 based on a change in the output voltage VDDC of the first power supply 110 and a change in the output voltage VLiB of the second power supply 120. In addition, the control unit 300 can identify a location where an anomaly has occurred based on a change in the current I1 flowing through the first SW 210 or a change in the current I2 flowing through the second SW 220.

The load group 410 of the first system is a group constituted by a load that operates using the first power supply 110 as a power supply when the control unit 300 controls the third SW 230 to be in a cutoff condition. In the load group 410 of the first system, the first system a load 411 and the first system b load 412 are in-vehicle devices that do not require a redundant power supply configuration. Here, the first system b load 412 provided with the first SW 210 may be a load, such as a heater, that does not affect the safety of the traveling of the vehicle even if the electric power is stopped during the time when the abnormality determination process is performed by the control unit 300. The first system steering control load 413 is a device for controlling the steering of the vehicle, the first system brake control load 414 is a device for controlling the brake control load of the vehicle, and the first system driving assistance control load 415 is a device for controlling the automatic driving of the vehicle, and is an in-vehicle device that requires a redundant power supply configuration.

The load group 420 of the second system is a group constituted by a load that operates using the second power supply 120 as a power supply when the control unit 300 controls the third SW 230 to be in the shut-off status. In the load group 420 of the second system, the second system c load 421 and the second system d load 422 are in-vehicle devices that do not require a redundant power supply configuration. Here, the second system d load 422 in which the second SW 220 is provided may be a load that does not affect the safety of the traveling of the vehicle even if the electric power is stopped during the period in which the abnormality determination process is performed by the control unit 300. The second system steering control load 423 is a device having the same configuration provided for backup of the first system steering control load 413, the second system brake control load 424 is a device having the same configuration provided for backup of the first system brake control load 414, and the second system driving assistance control load 425 is a device having the same configuration provided for backup of the first system driving assistance control load 415.

The number of loads belonging to the load group 410 of the first system mounted on the vehicle and the number of loads belonging to the load group 420 of the second system are not limited to those shown in FIG. 1.

Control

Figure 2A:
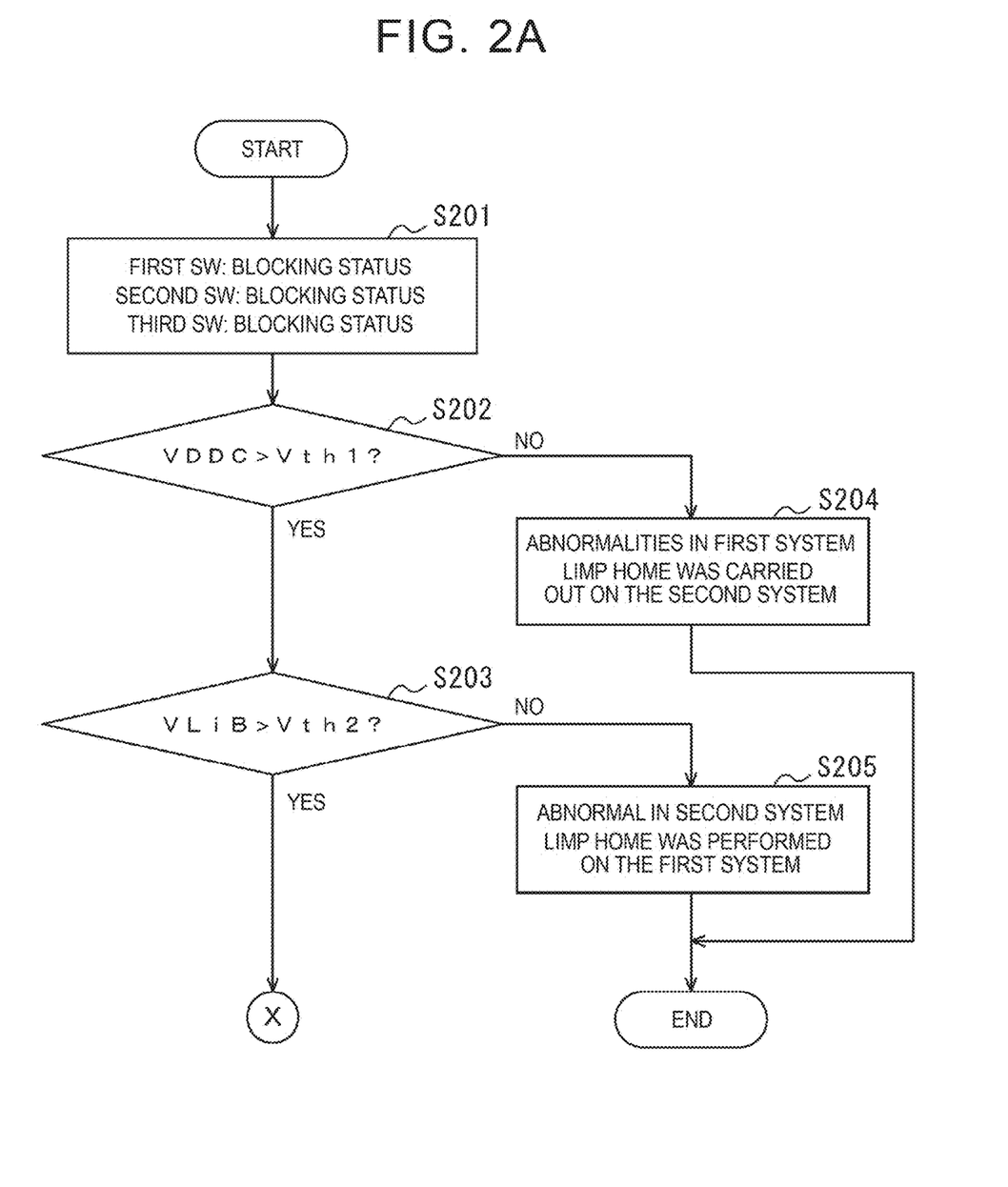
FIG. 2A is a process flow chart of switch-control at the time of occurrence of an anomaly executed by the vehicle power supply system according to the first embodiment.
Figure 2B:
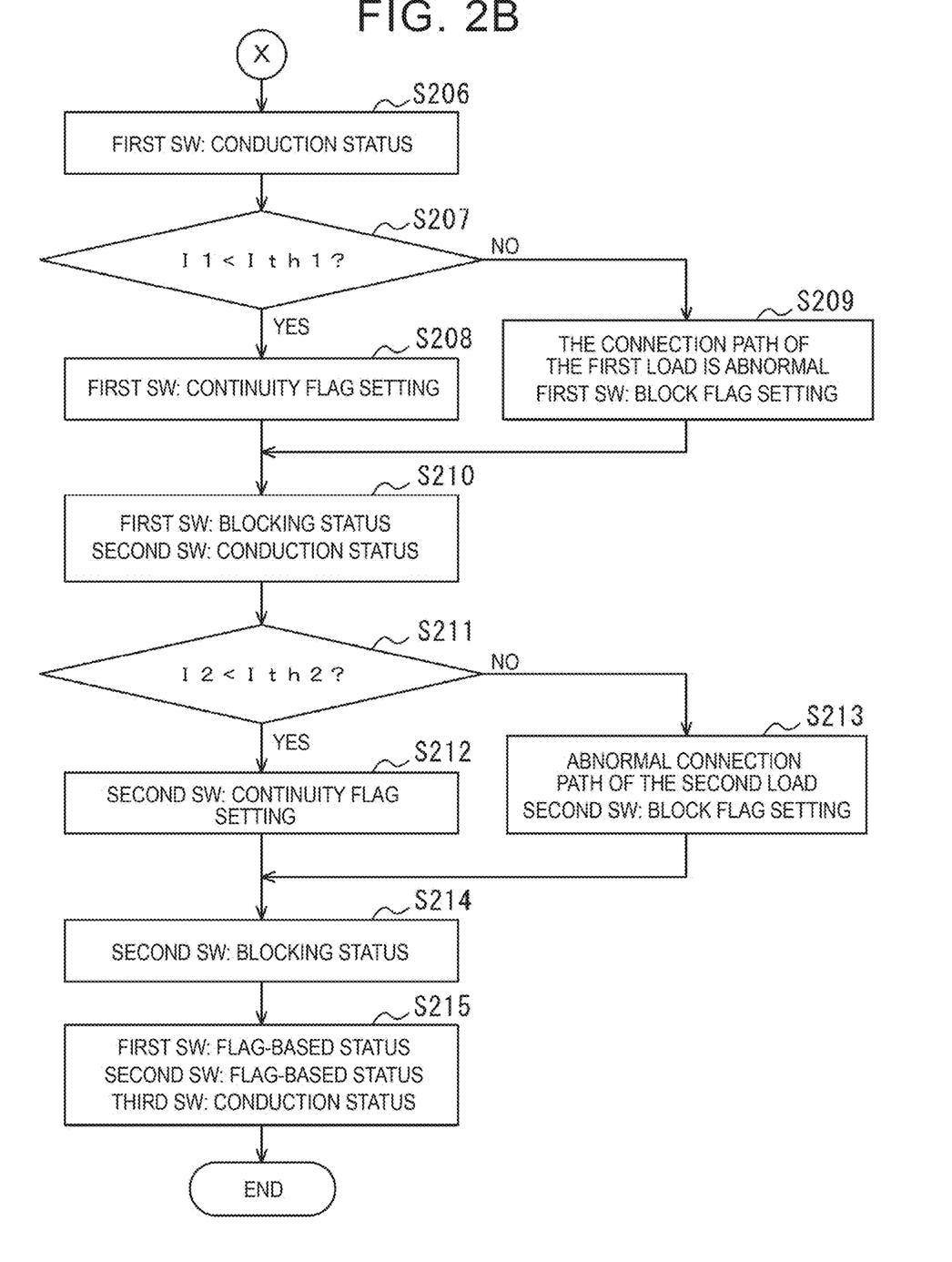
FIG. 2B is a process flow chart of switch-control at the time of occurrence of an anomaly executed by the vehicle power supply system according to the first embodiment.

Next, the operation of the vehicle power supply system 10 according to the first embodiment of the present disclosure will be described with reference to FIG. 2A and FIG. 2B. FIG. 2A and FIG. 2B are flowcharts for describing the steps of the switching control when an error occurs, which is executed by the vehicle power supply system 10. The process of FIG. 2A and the process of FIG. 2B are connected by a coupler X.

The switching control shown in FIGS. 2A and 2B is started when the control unit 300 determines that an abnormality has occurred in the electric power supplied to the vehicle power supply system 10. This determination can be made, for example, by detecting a decrease in the output voltage VDDC of the first power supply 110 and a decrease in the output voltage VLiB of the second power supply 120.

S201

The control unit 300 controls all of first SW 210, second SW 220, and third SW 230 to be shut off. By this control, the load group 410 of the first system and the load group 420 of the second system are separated from each other, and it is possible to easily determine in which system an abnormality has occurred. When all of first SW 210, second SW 220, and third SW 230 are controlled to be shut off, the process proceeds to S202.

S202

The control unit 300 determines whether or not the output-voltage VDDC of the first power supply 110 is greater than the third threshold value Vth1. This determination is made to confirm the presence or absence of an abnormality in the first system. Therefore, the third threshold value Vth1 is set to a predetermined voltage-value that is expected to decrease if an anomaly occurs in the first system. If it is determined that the output-voltage VDDC is greater than the third threshold value Vth1 (S202, Yes), the process proceeds to S203. On the other hand, when it is determined that the output-voltage VDDC is equal to or lower than the third threshold value Vth1 (S202, No), the process proceeds to S204.

S203

The control unit 300 determines whether or not the output-voltage VLiB of the second power supply 120 is greater than the fourth threshold value Vth2. This determination is made in order to confirm the presence or absence of abnormality in the second system. Therefore, the fourth threshold value Vth2 is set to a predetermined voltage-value that is expected to decrease if an anomaly occurs in the second system. If it is determined that the output-voltage VLiB is greater than the fourth threshold value Vth2 (S203, Yes), the process proceeds to S206. On the other hand, when it is determined that the output-voltage VLiB is equal to or lower than the fourth threshold value Vth2 (S203, No), the process proceeds to S205.

S204

The control unit 300 determines that an abnormality has occurred in the first system. Then, the control unit 300 causes the vehicle to perform a predetermined limp home by the second power supply 120 and the load group 420 of the second system. When the occurrence of the abnormality in the first system is determined and the limp home by the second system is performed, the switch control at the time of the occurrence of the abnormality is ended.

S205

The control unit 300 determines that an abnormality has occurred in the second system. Then, the control unit 300 causes the vehicle to perform a predetermined limp home by the first power supply 110 and the load group 410 of the first system. When the occurrence of the abnormality in the second system is determined and the limp home by the first system is performed, the switch control at the time of the occurrence of the abnormality is ended.

S206

The control unit 300 controls the first SW 210 to be conductive. By this control, power can be supplied from the first power supply 110 to the first system b load 412 (first load). When the first SW 210 is controlled to be conductive, the process proceeds to S207.

S207

The control unit 300 determines whether or not the current I1 flowing through the first SW 210 is less than the first threshold value Ith1. This determination is made in order to confirm the presence or absence of an anomaly such as a ground fault in the connecting line under the first SW 210. Therefore, the first threshold value Ith1 is set to a predetermined current value that is expected to flow if the connecting line under the first SW 210 is grounded. If it is determined that the current I1 is less than the first threshold value Ith1 (S207, Yes), the process proceeds to S208. On the other hand, when it is determined that the current I1 is equal to or larger than the first threshold value Ith1 (S207, No), the process proceeds to S209.

S208

The control unit 300 sets a conduction flag for the first SW 210. This conduction flag is a flag for specifying to control the switch to the conduction state after the completion of the series of abnormality determination processes. When the conduction flag is set for the first SW 210, the process proceeds to S210.

S209

The control unit 300 determines that an anomaly has occurred in the connection line under the control of the first SW 210, that is, in the connection path of the first system b load 412 (the first load). Then, the control unit 300 sets a cutoff flag for the first SW 210. This interruption flag is a flag for specifying that the switch is controlled to the interruption state after the series of abnormality determination processing is completed. When the blocking flag is set for the first SW 210, the process proceeds to S210.

S210

The control unit 300 controls the first SW 210 to be in the cutoff state and controls the second SW 220 to be in the conduction state. By this control, power can be supplied from the second power supply 120 to the second system d load 422 (second load). When the first SW 210 is controlled to the cutoff state and the second SW 220 is controlled to the conduction state, the process proceeds to S211.

S211

The control unit 300 determines whether or not the current I2 flowing through the second SW 220 is less than the second threshold value Ith2. This determination is made in order to confirm the presence or absence of an anomaly such as a ground fault in the connecting line under the second SW 220. Therefore, the second threshold value Ith2 is set to a predetermined current value that is expected to flow if the connecting line under the second SW 220 is grounded. If it is determined that the current I2 is less than the second threshold value Ith2 (S211, Yes), the process proceeds to S212. On the other hand, when it is determined that the current I2 is equal to or larger than the second threshold value Ith2(S211, No), the process proceeds to S213.

S212

The control unit 300 sets a conduction flag for the second SW 220. When the conduction flag is set for the second SW 220, the process proceeds to S214.

S213

The control unit 300 determines that an anomaly has occurred in the connection line under the control of the second SW 220, that is, in the connection path of the second system d load 422 (second load). Then, the control unit 300 sets a cutoff flag for the second SW 220. When the blocking flag is set for the second SW 220, the process proceeds to S214.

S214

The control unit 300 controls the second SW 220 to be shut off. By this control, the abnormality determination process is completed. When the second SW 220 is controlled to be in the cutoff status, the process proceeds to S215.

S215

The control unit 300 controls the first SW 210 and the second SW 220 to be in a conduction state or a cutoff state based on the flags set respectively, and controls the third SW 230 to be in a conduction state. When the connected states of first SW 210, second SW 220, and third SW 230 are respectively controlled, the switching control at the time of the occurrence of the abnormality is ended.

According to the switch control at the time of occurrence of abnormality according to the first embodiment described above, when the first system and the second system are separated from each other due to an abnormality in the power supply, the first system b load 412 and the second system d load 422 that do not affect the safety of the vehicle travel are also stopped in a short time stop, thereby eliminating unnecessary power consumption. As a result, it is possible to avoid a situation in which the abnormality determination processing of each system cannot be performed due to insufficient power (such as at a low temperature) of the first power supply 110 or the second power supply 120.

Further, according to the switching control at the time of occurrence of abnormality according to the first embodiment, when the first system b load 412 and the second system d load 422 are stopped by first SW 210 and second SW 220, the presence or absence of occurrence of abnormality in the connecting path is also determined. Accordingly, when the first SW 210 and the second SW 220 are turned on by erroneous determination, it is possible to prevent hunting phenomena that are determined to be abnormal again.

Second Embodiment

Configuration

Figure 3:
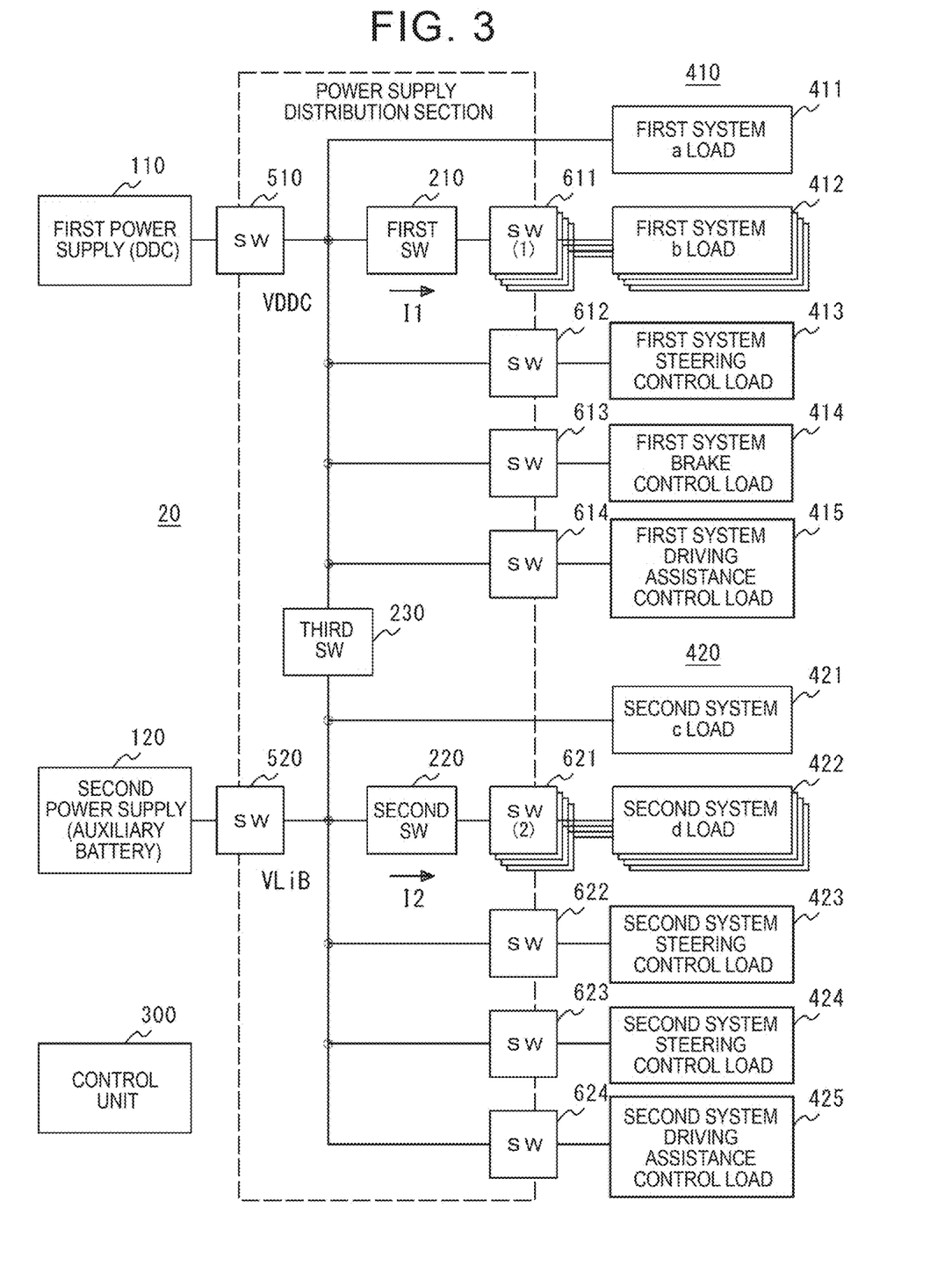
FIG. 3 is a functional block diagram of a vehicle power supply system and a peripheral portion thereof according to a second embodiment of the present disclosure.

FIG. 3 is a functional block diagram of the vehicle power supply system 20 and its peripheral parts according to the second embodiment of the present disclosure. The functional block illustrated in FIG. 3 includes a vehicle power supply system 20, a load group 410 of the first system, and a load group 420 of the second system. The vehicle power supply system 20 includes a first power supply 110, a second power supply 120, a first SW 210, a second SW 220, a third SW 230, SW 510, SW 520, a plurality of SW(1) 611, a SW 612 to 614, a plurality of SW(2) 621, a SW 622 to 624, and a control unit 300. The load group 410 of the first system includes a first system a load 411, a plurality of first system b loads 412, a first system steering control load 413, a first system brake control load 414, and a first system driving assistance control load 415. The load group 420 of the second system includes a second system c load 421, a plurality of second system d loads 422, a second system steering control load 423, a second system brake control load 424, and a second system driving assistance control load 425. The vehicle power supply system 20, the load group 410 of the first system, and the load group 420 of the second system may be mounted on the vehicle.

The first power supply 110 is a power supply source for supplying power to the load group 410 of the first system and the load group 420 of the second system. The first power supply 110 is connected to the load group 410 side of the first system. Examples of the first power supply 110 include a secondary battery (high-voltage battery) configured to be chargeable and dischargeable, such as a lithium-ion battery and a lead-acid battery, and a DCDC converter (DDC) that converts electric power of a secondary battery (not shown) into a predetermined voltage.

The second power supply 120 is a power supply source for supplying power to the load group 410 of the first system and the load group 420 of the second system. The second power supply 120 is connected to the load group 420 side of the second system. As the second power supply 120, a secondary battery (auxiliary battery) configured to be chargeable and dischargeable, such as a lithium ion battery, or the like, can be exemplified.

First SW 210, second SW 220, third SW 230, SW 510, SW 520, the plurality of SW(1) 611, SW 612 to 614, the plurality of SW(2) 621, and SW 622 to 624 are switch elements (semiconductor switches or the like) capable of switching between the electrically conductive state and the disconnected state under the control of the control unit 300, respectively. In SW 510, SW 520, the plurality of SW(1) 611, SW 612 to 614, the plurality of SW(2) 621, and SW 622 to 624 are provided as protective functions (fuse functions) in the event of a wire harness (W/H) ground fault.

The first SW 210 is inserted between the first power supply 110 and a plurality of first system b loads 412 (a plurality of first loads) belonging to the load group 410 of the first system. The second SW 220 is inserted between the second power supply 120 and a plurality of second system d loads 422 (a plurality of second loads) belonging to the load group 420 of the second system. The third SW 230 is inserted between the first power supply 110 and the second power supply 120. SW 510 is inserted between the first power supply 110 and the load group 410 of the first system. SW 520 is inserted between the second power supply 120 and the load group 420 of the second system. The plurality of SW(1) 611 are provided corresponding to the plurality of first system b loads 412, and are respectively inserted between the first SW 210 and the respective first system b loads 412. SW 612 is inserted between SW 510 and the first system steering control load 413. SW 613 is inserted between SW 510 and the first system brake control load 414. SW 614 is inserted between SW 510 and the first system driving assistance control load 415. The plurality of SW(2) 621 are provided corresponding to the plurality of second system d loads 422, and are respectively inserted between the second SW 220 and the respective second system d loads 422. SW 622 is inserted between SW 520 and the second system steering control load 423. SW 623 is inserted between SW 520 and the second system brake control load 424. SW 624 is inserted between SW 520 and the second system driving assistance control load 425.

The control unit 300 monitors the state of the power supplied to the vehicle power supply system 20, first SW 210, second SW 220, third SW 230, SW 510, SW 520, a plurality of SW(1) 611, SW 612 to 614, a plurality of SW(2) 621, and a configuration for controlling (switching) the state of conduction/interruption of SW 622 to 624. The control unit 300 can detect the occurrence of an anomaly in supplying power to the vehicle power supply system 10 based on a change in the output voltage VDDC of the first power supply 110 and a change in the output voltage VLiB of the second power supply 120. In addition, the control unit 300 can identify a location where an anomaly has occurred based on a change in the current I1 flowing through the first SW 210 or a change in the current I2 flowing through the second SW 220.

The load group 410 of the first system is a group constituted by a load that operates using the first power supply 110 as a power supply when the control unit 300 controls the third SW 230 to be in a cutoff condition. In the load group 410 of the first system, the first system a load 411 and the plurality of first system b loads 412 are in-vehicle devices that do not require a redundant power supply configuration. Here, each of the plurality of first system b loads 412 provided with the first SW 210 may be a load that does not affect the safety of the traveling of the vehicle even if the electric power is stopped during the time when the abnormal determination process is performed by the control unit 300, for example, a vehicle-mounted device such as a heater. The first system steering control load 413 is a device for controlling the steering of the vehicle, the first system brake control load 414 is a device for controlling the brakes of the vehicle, and the first system driving assistance control load 415 is a device for controlling the automatic driving of the vehicle, and is an in-vehicle device that requires a redundant power supply configuration.

The load group 420 of the second system is a group constituted by a load that operates using the second power supply 120 as a power supply when the control unit 300 controls the third SW 230 to be in the shut-off status. In the load group 420 of the second system, the second system c load 421 and the plurality of second system d loads 422 are in-vehicle devices that do not require a redundant power supply configuration. Here, the plurality of second system d loads 422 provided with the second SW 220 can be set as loads that do not affect the safety of the traveling of the vehicles even if the electric power is stopped during the time when the abnormal determination process is performed by the control unit 300. The second system steering control load 423 is a device having the same configuration provided for backup of the first system steering control load 413, the second system brake control load 424 is a device having the same configuration provided for backup of the first system brake control load 414, and the second system driving assistance control load 425 is a device having the same configuration provided for backup of the first system driving assistance control load 415.

Figure 4A:
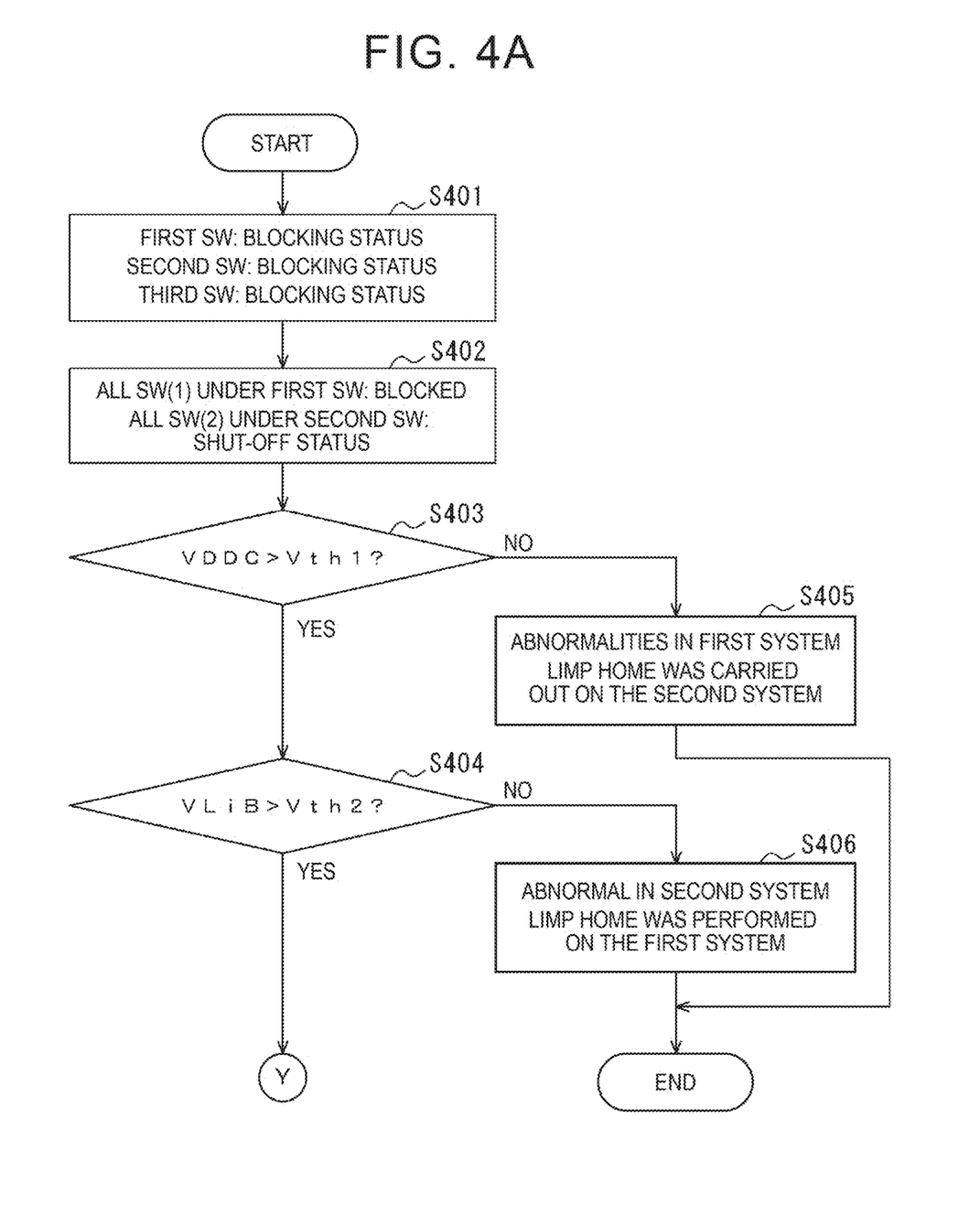
FIG. 4A is a process flow chart of switch-control at the time of occurrence of an abnormality executed by the vehicle power supply system according to the second embodiment.
Figure 4B:
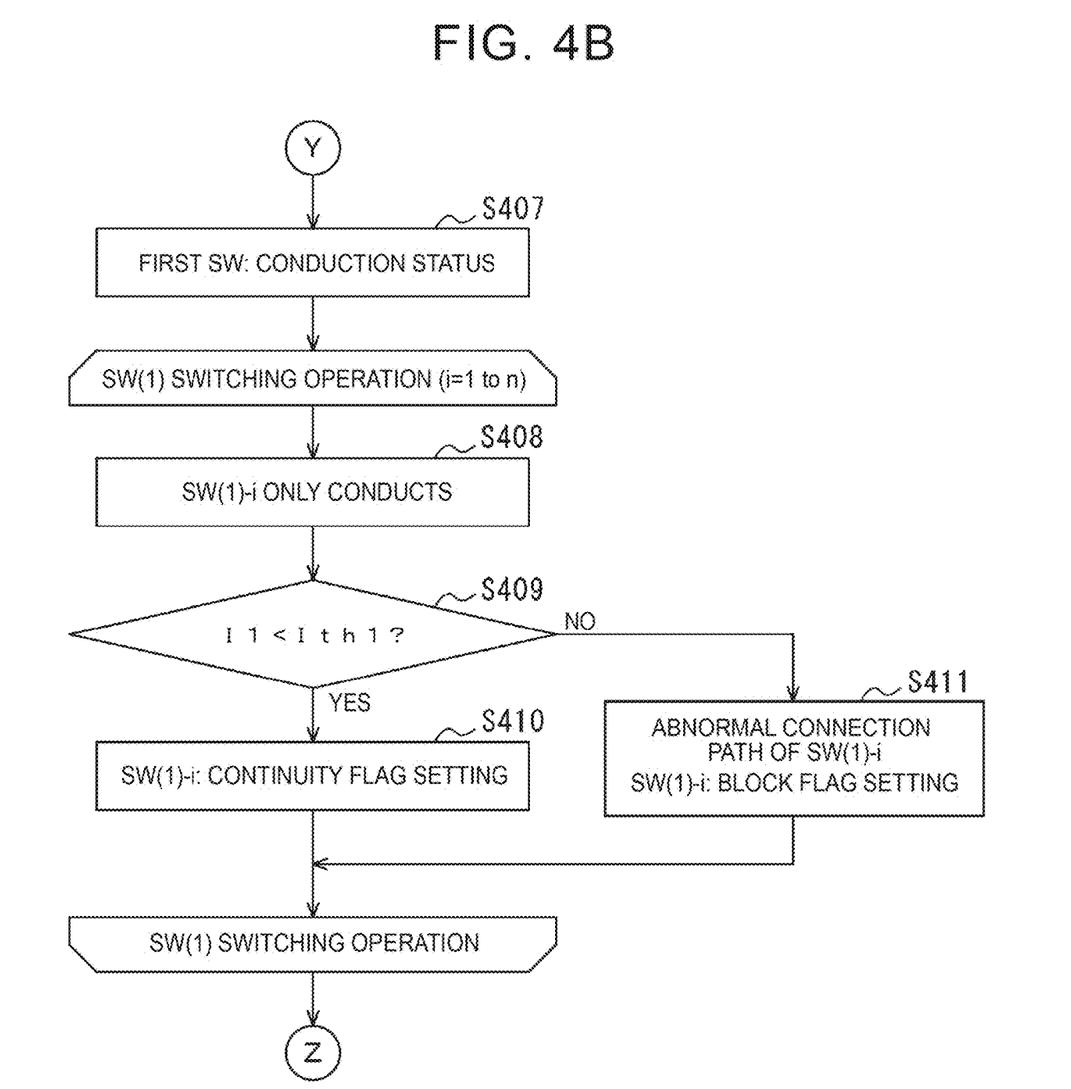
FIG. 4B is a process flow chart of the switching control at the time of the abnormal occurrence executed by the vehicle power supply system according to the 2 embodiment.
Figure 4C:
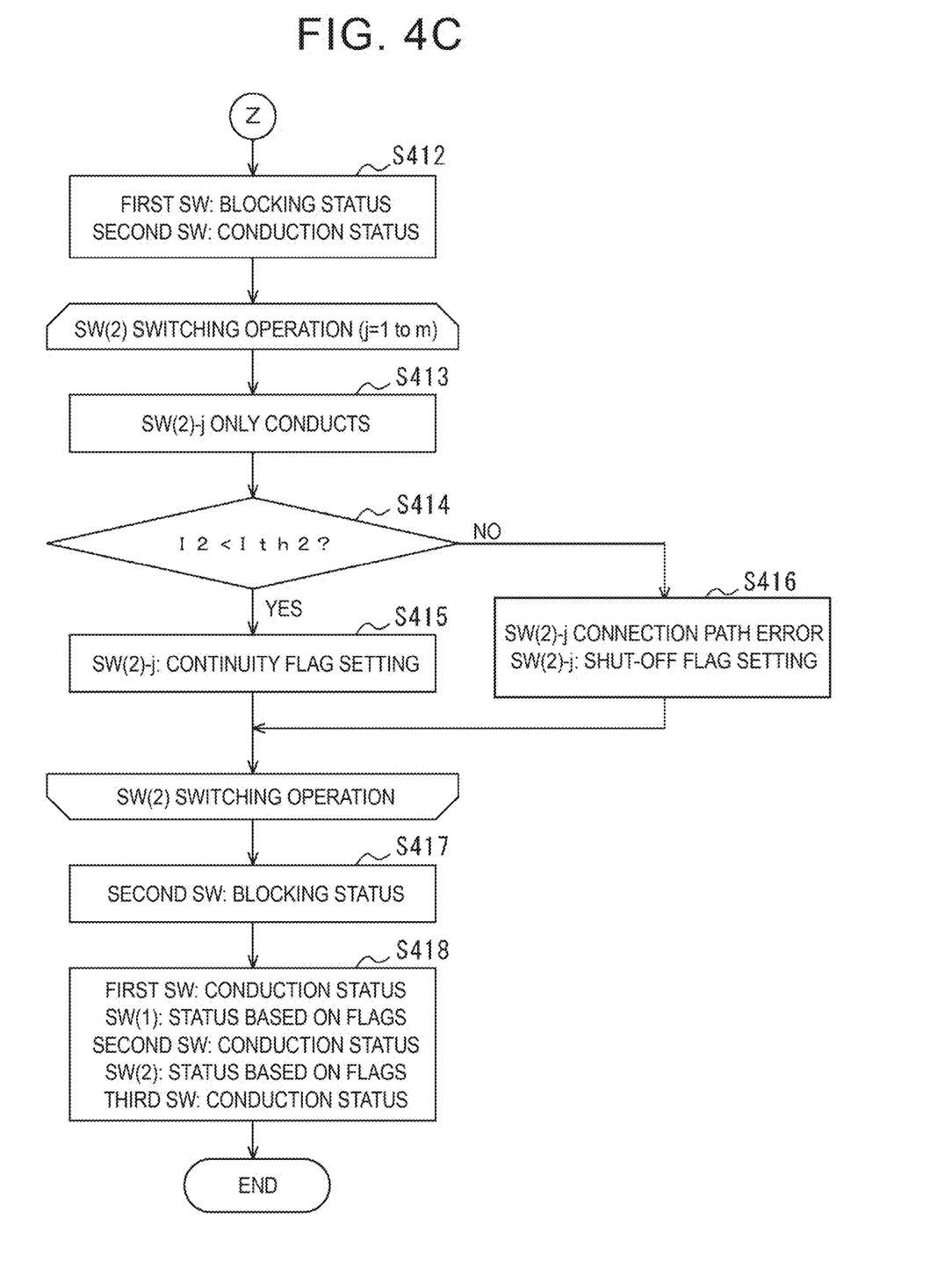
FIG. 4C is a flow chart of the switching control performed by the vehicle power supply system according to the second embodiment.

The number of loads belonging to the load group 410 of the first system mounted on the vehicle, the number of loads belonging to the load group 420 of the second system, the number of the plurality of first system b loads 412, and the number of the plurality of second system d loads 422 are not limited to those illustrated in FIG. 3. Control Next, the operation of the vehicle power supply system 20 according to the second embodiment of the present disclosure will be described with reference to FIG. 4A, FIG. 4B, and FIG. 4C. FIG. 4A, FIG. 4B, and FIG. 4C are flow charts for describing a process of switching control when an error occurs, which is executed by the vehicle power supply system 20. The processing of FIG. 4A and the processing of FIG. 4B are connected by the coupler Y, and the processing of FIG. 4B and the processing of FIG. 4C are connected by the coupler Z.

The switching control in FIGS. 4A, 4B, and 4C is started when the control unit 300 determines that an abnormality has occurred in the electric power supplied to the vehicle power supply system 20. This determination can be made, for example, by detecting a decrease in the output voltage VDDC of the first power supply 110 and a decrease in the output voltage VLiB of the second power supply 120. It is assumed that SW 510, SW 520, the plurality of SW(1) 611, SW 612 to 614, the plurality of SW(2) 621, and SW 622 to 624 are controlled to be conductive.

S401
The control unit 300 controls all of first SW 210, second SW 220, and third SW 230 to be shut off. By this control, the load group 410 of the first system and the load group 420 of the second system are separated from each other, and it is possible to easily determine in which system an abnormality has occurred. When all of first SW 210, second SW 220, and third SW 230 are controlled to be shut off, the process proceeds to S402.

S402
The control unit 300 controls all of the plurality of SW(1) 611 connected under the control of the first SW 210 to the cutoff state, and controls all of the plurality of SW(2) 621 connected under the control of the second SW 220 to the cutoff state. By this control, the power supply to the plurality of first system b loads 412 and the plurality of second system d loads 422 is stopped. When the plurality of SW(1) 611 and the plurality of SW(2) 621 are all controlled to the shut-off status, the process proceeds to S403.

S403
The control unit 300 determines whether or not the output-voltage VDDC of the first power supply 110 is greater than the third threshold value Vth1. This determination is made to confirm the presence or absence of an abnormality in the first system. Therefore, the third threshold value Vth1 is set to a predetermined voltage-value that is expected to decrease if an anomaly occurs in the first system. If it is determined that the output-voltage VDDC is greater than the third threshold value Vth1 (S403, Yes), the process proceeds to S404. On the other hand, when it is determined that the output-voltage VDDC is equal to or lower than the third threshold value Vth1 (S403, No), the process proceeds to S405.

S404
The control unit 300 determines whether or not the output-voltage VLiB of the second power supply 120 is greater than the fourth threshold value Vth2. This determination is made in order to confirm the presence or absence of abnormality in the second system. Therefore, the fourth threshold value Vth2 is set to a predetermined voltage-value that is expected to decrease if an anomaly occurs in the second system. If it is determined that the output-voltage VLiB is greater than the fourth threshold value Vth2 (S404, Yes), the process proceeds to S407. On the other hand, when it is determined that the output-voltage VLiB is equal to or lower than the fourth threshold value Vth2 (S404, No), the process proceeds to S406.

S405
The control unit 300 determines that an abnormality has occurred in the first system. Then, the control unit 300 causes the vehicle to perform a predetermined limp home by the second power supply 120 and the load group 420 of the second system. When the occurrence of the abnormality in the first system is determined and the limp home by the second system is performed, the switch control at the time of the occurrence of the abnormality is ended.

S406
The control unit 300 determines that an abnormality has occurred in the second system. Then, the control unit 300 causes the vehicle to perform a predetermined limp home by the first power supply 110 and the load group 410 of the first system. When the occurrence of the abnormality in the second system is determined and the limp home by the first system is performed, the switch control at the time of the occurrence of the abnormality is ended.

S407
The control unit 300 controls the first SW 210 to be conductive. By this control, power can be supplied from the first power supply 110 to the plurality of first system b loads 412 (first loads) via the plurality of SW(1) 611. When the first SW 210 is controlled to be conductive, the process proceeds to S408.

S408
The control unit 300 controls only "SW(1)-i", which is one of the plurality of SW(1) 611, to be conductive (i is any one of the total numbers n of 1 to SW(1) 611). When SW(1)-i is controlled to be conductive, the process proceeds to S409.

S409
The control unit 300 determines whether or not the current I1 flowing through the first SW 210 is less than the first threshold value Ith1. This determination is made in order to confirm the presence or absence of an anomaly such as a ground fault in the connecting line under the first SW 210. Therefore, the first threshold value Ith1 is set to a predetermined current value that is expected to flow if the connecting line under the first SW 210 is grounded. If it is determined that the current I1 is less than the first threshold value Ith1 (S409, Yes), the process proceeds to S410. On the other hand, when it is determined that the current I1 is equal to or larger than the first threshold value Ith1 (S409, No), the process proceeds to S411.

S410

The control unit 300 sets a conduction flag for SW(1)–i. This conduction flag is a flag for specifying to control the switch to the conduction state after the completion of the series of abnormality determination processes. When the conduction flag is set for SW(1)–i, the process proceeds to S408.

S411

The control unit 300 determines that an anomaly has occurred in the connecting line that is under the control of the first SW 210 and under the control of SW(1)–i. Then, the control unit 300 sets a blocking flag for SW(1)–i. This interruption flag is a flag for specifying that the switch is controlled to the interruption state after the series of abnormality determination processing is completed. When the blocking flag is set for SW(1)–i, the process proceeds to S408.

SW(1) switching operation shown in the above S408 to S411 is repeatedly performed until all (SW(1)–1 to SW(1)–n) of the plurality of SW(1) 611 are performed.

S412

The control unit 300 controls the first SW 210 to be in the cutoff state and controls the second SW 220 to be in the conduction state. By this control, electric power can be supplied from the second power supply 120 to the plurality of second system d loads 422 (second loads) via the plurality of SW(2) 621. When the first SW 210 is controlled to the cutoff state and the second SW 220 is controlled to the conduction state, the process proceeds to S413.

S413

The control unit 300 controls only "SW(2)–j", which is one of the plurality of SW(2) 621, to be conductive (j is any one of the total numbers m of 1 to SW(2) 621). When SW(2)–j is controlled to be conductive, the process proceeds to S414.

S414

The control unit 300 determines whether or not the current I2 flowing through the second SW 220 is less than the second threshold value Ith2. This determination is made in order to confirm the presence or absence of an anomaly such as a ground fault in the connecting line under the second SW 220. Therefore, the second threshold value Ith2 is set to a predetermined current value that is expected to flow if the connecting line under the second SW 220 is grounded. If it is determined that the current I2 is less than the second threshold value Ith2 (S414, Yes), the process proceeds to S415. On the other hand, when it is determined that the current I2 is equal to or larger than the second threshold value Ith2 (S414, No), the process proceeds to S416.

S415

The control unit 300 sets a conduction flag for SW(2)–j. This conduction flag is a flag for specifying to control the switch to the conduction state after the completion of the series of abnormality determination processes. When the conduction flag is set for SW(2)–j, the process proceeds to S413.

S416

The control unit 300 determines that an anomaly has occurred in the connecting line that is under the control of the second SW 220 and under the control of SW(2)–j. Then, the control unit 300 sets a blocking flag for SW(2)–j. This interruption flag is a flag for specifying that the switch is controlled to the interruption state after the series of abnormality determination processing is completed. When the blocking flag is set for SW(2)–j, the process proceeds to S413.

SW(2) switching operation shown in the above S413 to S416 is repeatedly performed until all (SW(2)–1 to SW(2)–m) of the plurality of SW(2) 621 are performed.

S417

The control unit 300 controls the second SW 220 to be shut off. By this control, the abnormality determination process is completed. When the second SW 220 is controlled to be in the cutoff status, the process proceeds to S418.

S418

The control unit 300 controls first SW 210, second SW 220, and third SW 230 to be in the conduction state, and controls the plurality of SW(1) 611 and the plurality of SW(2) 621 to be in the conduction state or the cutoff state based on flags set respectively. When first SW 210, second SW 220, third SW 230, the plurality of SW(1) 611, and the plurality of SW(2) 621 are connected to each other, the switching control at the time of the occurrence of the abnormality is ended.

According to the switch control at the time of occurrence of abnormality according to the second embodiment described above, when an abnormality occurs in power supply and the first system and the second system are separated from each other, the plurality of first system b loads 412 and the plurality of second system d loads 422 that do not affect the safety of the vehicle travel are also stopped in a short time stop, thereby eliminating unnecessary power consumption. As a result, it is possible to avoid a situation in which the abnormality determination processing of each system cannot be performed due to insufficient power (such as at a low temperature) of the first power supply 110 or the second power supply 120.

Further, according to the switch control at the time of occurrence of abnormality according to the second embodiment, the state of conduction/interruption of the plurality of SW(1) 611 and the plurality of SW(2) 621 under the control of the plurality of SW(1) 611 and the plurality of SW(2) 621 is controlled based on the presence or absence of occurrence of abnormality in the connection path. If the control of the plurality of SW(1) 611 and the plurality of SW(2) 621 (shut-off instruction or the like) is performed using the signal terminal of the conventional microcomputer, the control unit 300 only needs to control first SW 210, second SW 220, and third SW 230, and thus the circuit-scale of the vehicle power supply system 20 can be reduced.

Operations and Effects

As described above, the vehicle power supply systems 10 and 20 according to the embodiments of the present disclosure include the first SW 210 inserted between the first power supply 110 connected to the load group 410 of the first system and the first system b load 412 belonging to the load group 410 of the first system, the second SW 220 inserted between the second power supply 120 connected to the load group 420 of the second system and the second system d load 422 belonging to the load group 420 of the second system, and the third SW 230 inserted between the first power supply 110 and the second power supply 120, and the control unit 300 appropriately controls the conduction/interruption status of first SW 210, second SW 220, and the third SW 230.

By this control, when an abnormality occurs in the power supplying, it is possible to identify the subordinate of the first SW 210 of the first system as the abnormality generating portion on the basis of the change in the current I1 flowing through the first SW 210 at the time of conduction and interruption of the first SW 210. In addition, when an abnormality occurs in the power supplying, the subordinate of the second SW 220 of the second system can be identified as the abnormality generating portion on the basis of the change in the current I2 flowing through the second SW 220 at the time of the conduction and the interruption of the second SW 220. By specifying the abnormality occurrence portion, the abnormality occurrence portion can be shut off and power supply to other portions other than the abnormality occurrence portion can be restored.

Although the embodiments of the present disclosure have been described above, the present disclosure can be regarded as not only a vehicle power supply system but also a control method performed by the vehicle power supply system, a program of the control method, a computer-readable non-transitory storage medium storing the program, a vehicle including a vehicle power supply system, and the like.

The vehicle power supply system of the present disclosure can use a first power supply connected to a load group of a first system so as to be capable of supplying electric power, and a second power supply connected to a load group of a second system so as to be capable of supplying electric power, for power control of an onboard vehicle or the like.

What is claimed is:

1. A vehicle power supply system installed in a vehicle, the vehicle power supply system comprising:
    a first power supply connected to a load group of a first system so as to supply power;
    a second power supply connected to a load group of a second system so as to supply power;
    a first switch interposed between the first power supply and a first load belonging to the load group of the first system;
    a second switch interposed between the second power supply and a second load belonging to the load group of the second system;
    a third switch interposed between the first power supply and the second power supply; and
    a control unit configured to control a state of conducting and nonconducting of the first switch, the second switch, and the third switch, wherein
    when an abnormality occurs in supply of power, the control unit is configured to control the first switch, the second switch, and the third switch, to identify a site of an abnormality occurring, based on a current flowing through the first switch and a current flowing through the second switch, and
    when an abnormality occurs in the supply of power, the third switch is placed in a state of nonconducting, and the control unit is configured to
        acquire currents flowing through the first switch regarding each of when the first switch is conducting and when nonconducting, and when a change of current flowing through the first switch is no less than a first threshold value, identify downstream of the first switch as being the site at which the abnormality is occurring, and
        acquire currents flowing through the second switch regarding each of when the second switch is conducting and when nonconducting, and when a change of current flowing through the second switch is no less than a second threshold value, identify downstream of the second switch as being the site at which the abnormality is occurring.

2. The vehicle power supply system according to claim 1 wherein the control unit is configured to control the first switch to the nonconducting state when identifying downstream of the first switch as being the site at which the abnormality is occurring, and controls the second switch to the nonconducting state when identifying downstream of the second switch as being the site at which the abnormality is occurring.

3. The vehicle power supply system according to claim 1, wherein the first load and the second load are loads that do not affect safety of a vehicle that is traveling even when the supply of power is stopped during a period in which abnormality determination processing is performed by the control unit.

* * * * *